(12) United States Patent
Irwin et al.

(10) Patent No.: US 7,970,686 B1
(45) Date of Patent: Jun. 28, 2011

(54) SYSTEM AND METHOD OF INTERFACING FOR CLIENT APPLICATION PROGRAMS TO ACCESS A DATA MANAGEMENT SYSTEM

(75) Inventors: Fred Irwin, Frankfurt (DE); Mark Johnson, Near Wigan (GB); Neil D. Potter, Westfield, NJ (US); Peter E. Raynor, Hinchley Wood Esher (GB); Maria Torremante, Weisbaden (DE)

(73) Assignee: Citigroup Global Markets, Inc., New York, NY (US)

( * ) Notice: Subject to any disclaimer, the term of this patent is extended or adjusted under 35 U.S.C. 154(b) by 1604 days.

(21) Appl. No.: 09/662,588

(22) Filed: Sep. 15, 2000

(51) Int. Cl.
*G06Q 40/00* (2006.01)
(52) U.S. Cl. ........................................................ 705/37
(58) Field of Classification Search .............. 705/35–37
See application file for complete search history.

(56) References Cited

U.S. PATENT DOCUMENTS

| | | | |
|---|---|---|---|
| 4,363,489 A | 12/1982 | Chodak et al. | 273/237 |
| 4,412,287 A | 10/1983 | Braddock, III | 705/37 |
| 4,672,572 A | 6/1987 | Alsberg | 726/11 |
| 4,674,044 A * | 6/1987 | Kalmus et al. | 705/37 |
| 4,677,552 A | 6/1987 | Sibley, Jr. | 705/37 |
| 4,774,662 A | 9/1988 | Ito et al. | 705/42 |
| 4,789,928 A | 12/1988 | Fujisaki | 705/37 |
| 4,823,265 A | 4/1989 | Nelson | 705/35 |
| 4,825,000 A | 4/1989 | Griffith et al. | 235/379 |
| 4,903,201 A | 2/1990 | Wagner | 705/37 |
| 4,942,616 A | 7/1990 | Linstroth et al. | 704/275 |
| 4,975,865 A | 12/1990 | Carrette et al. | 700/10 |
| 5,077,665 A | 12/1991 | Silverman et al. | 705/37 |
| 5,095,429 A | 3/1992 | Harris et al. | 705/35 |
| 5,101,353 A | 3/1992 | Lupien et al. | 705/37 |
| 5,113,499 A | 5/1992 | Ankney et al. | 340/574 |
| 5,126,936 A | 6/1992 | Champion et al. | 705/36 |
| 5,136,501 A | 8/1992 | Silverman et al. | 705/37 |
| 5,175,797 A | 12/1992 | Funabashi et al. | 706/16 |
| 5,258,908 A | 11/1993 | Hartheimer et al. | 705/37 |
| 5,270,922 A | 12/1993 | Higgins | 705/37 |
| 5,297,031 A * | 3/1994 | Gutterman et al. | 705/37 |
| 5,297,032 A | 3/1994 | Trojan et al. | 705/37 |
| 5,305,200 A | 4/1994 | Hartheimer et al. | 705/37 |
| 5,339,392 A | 8/1994 | Risberg et al. | 345/762 |
| 5,375,055 A | 12/1994 | Togher et al. | 705/37 |

(Continued)

FOREIGN PATENT DOCUMENTS

EP         0388162 A2      3/1990

(Continued)

OTHER PUBLICATIONS

Schildt, Herbert. Turbo C/C++: The Complete Reference. Osborne McGraw-Hill. Berkeley, CA. 1990. p. 13, 561 and 727-730.*

(Continued)

*Primary Examiner* — Jason M Borlinghaus
(74) *Attorney, Agent, or Firm* — Eric L. Sophir; SNR Denton US LLP (57) ABSTRACT

A system and method are disclosed for communicating information between a securities customer and a trader. The system includes a computer which has three class components for completing the communications between the customer and the trader. A first component manages trading functions, a second component manages customer log-in and password, and the third component manages communication between the first two components and a trading system.

20 Claims, 6 Drawing Sheets

U.S. PATENT DOCUMENTS

| | | | | |
|---|---|---|---|---|
| 5,500,793 | A | 3/1996 | Deming, Jr. et al. | 705/37 |
| 5,508,913 | A | 4/1996 | Yamamoto et al. | 705/37 |
| 5,557,517 | A | 9/1996 | Daughterty, III | 705/37 |
| 5,692,233 | A | 11/1997 | Garman | 705/36 |
| 5,710,889 | A | 1/1998 | Clark et al. | 235/379 |
| 5,717,989 | A | 2/1998 | Tozzoli et al. | 705/37 |
| 5,727,165 | A | 3/1998 | Ordish | 705/37 |
| 5,749,077 | A | 5/1998 | Campbell | 705/36 |
| 5,761,661 | A | 6/1998 | Coussens et al. | 707/9 |
| 5,765,141 | A | 6/1998 | Spector | 705/14 |
| 5,774,877 | A * | 6/1998 | Patterson et al. | 705/35 |
| 5,778,224 | A | 7/1998 | Tobe et al. | 718/100 |
| 5,787,402 | A | 7/1998 | Potter et al. | 705/37 |
| 5,788,224 | A | 8/1998 | Platt | 256/66 |
| 5,794,219 | A | 8/1998 | Brown | 705/37 |
| 5,797,127 | A | 8/1998 | Walker et al. | 705/5 |
| 5,809,483 | A | 9/1998 | Broka et al. | 705/37 |
| 5,832,505 | A | 11/1998 | Kasso et al. | 707/104 |
| 5,842,178 | A | 11/1998 | Giovannoli | 705/26 |
| 5,864,827 | A | 1/1999 | Wilson | 705/35 |
| 5,873,071 | A | 2/1999 | Ferstenberg et al. | 705/37 |
| 5,890,138 | A | 3/1999 | Godin et al. | 705/26 |
| 5,893,079 | A | 4/1999 | Cwenar | 705/36 R |
| 5,915,209 | A | 6/1999 | Lawrence | 340/3.7 |
| 5,970,479 | A | 10/1999 | Shepherd | 705/37 |
| 5,987,432 | A | 11/1999 | Zusman et al. | 705/35 |
| 6,014,627 | A * | 1/2000 | Togher et al. | 705/1 |
| 6,058,378 | A | 5/2000 | Clark et al. | 705/37 |
| 6,134,535 | A * | 10/2000 | Belzberg | 705/37 |
| 6,282,521 | B1 | 8/2001 | Howorka | 705/36 R |

FOREIGN PATENT DOCUMENTS

| | | |
|---|---|---|
| EP | 0401203 A2 | 5/1990 |
| EP | 0434224 A2 | 11/1990 |
| EP | 0512702 A2 | 5/1991 |
| EP | 0471063 B1 | 2/1992 |
| EP | 0513484 A2 | 2/1992 |
| EP | 0 762 304 A1 | 3/1997 |
| GB | 2161003 A | 6/1985 |
| GB | 2165421 A | 4/1986 |
| GB | 2258061 A | 1/1993 |
| GB | 2277389 B | 3/1994 |
| JP | 04-030251 | 2/1992 |
| JP | 07-175697 | 7/1995 |
| JP | 2000-512405 | 9/2000 |
| WO | WO 91/14231 | 3/1990 |
| WO | WO 95/06918 | 3/1995 |
| WO | WO 95/26005 | 9/1995 |
| WO | WO 97/10559 | 3/1997 |
| WO | WO 98/53417 | 11/1998 |

OTHER PUBLICATIONS

Coughlin, George Gordon. Your Handbook Of Everyday Law. 5th Edition. Harper Collins Publishing. New York, NY. 1993. pp. 50-51.*
Ichbiah, J; Barnes, J; Firth, R; and Woodger, M. Rationale for the Design of the ADA Programming Language. Cambridge University Press. 1991. pp. 109-112 and 149-150.*
Terano, T; Sugeno, M; Mukaidono, M; and Shigemasu, K. Fuzzy Engineering Toward Human Friendly Systems. Ohmsha. 1992. pp. 574-577.*
Published Search Report, No. EP 1 087 313 A3, published Mar. 31, 2004.
Anonymous, Cash Management News, No. 74, pp. 1-2, Nov. 1991.
Anonymous, Automation of foreign exchange activity in Supplement to Corporate Finance, pp. 20-23, Sep. 1992.
Orfali, Robert and Harkey, Dan, "Client server survival guide with OS/2," 1994 by Nostrand Reinhold, pp. 386-391.
Chon, S., Jo, J., and Park, Y., Time-out situation signaling method for real-time OS-involves calling *interrupt* service routine and processing *timeout* request, KR 9407830 B, Abstract, 1 page, Jun. 18, 1996.
Anonymous, Financial Information Exchange Protocol, Version 2.7(a), pp. i-iv, 1-9, 40-41, Jan. 17, 1995.
Interactive Brokers LLC, "Real time global electronic trade execution," Interactive Brokers Brochure, Oct. 16, 1997.
Opposition by Deutsche Bank AG (German and translated versions) with attachments (German and translated versions), dated Dec. 19, 1997, having EPO file No. 0384-49.676EP-kö.
Opposition by Bayerische Vereinsbank AG (German and translated versions) with attachments (German and translated versions), dated Dec. 19, 1997, having EPO file No. 0384-49.676EP-kö.
DTB Deutsche Terminborse GmbH (a) Rundschreiben No. 66/91 dated Jun. 8, 1991 (German), (b) Letter of Mark Thornburgh dated Dec. 16, 1997 (English).
Confirmation of the QT Optec company dated Dec. 12, 1997 (German) with Encl. 1 to 3 (German/English).
Extract from the stock exchange regulations of the German Futures Exchange DTB of Mar. 1995 (German).
Anwenderhandbuch "OptionsSchelngeschaft," dated Dec. 2, 1997, pp. 1-22 (German).
DIOS Kurzbeschreibung, SGZ-Bank, Sep. 26, 1994 (German).
DIOS Prospekt, SGZ-Bank, Apr. 1995 (German).
Ablauf von DIOS Bildschirmmasken (German).
Begriff der Reaktionszeit im DIOS, dated May 25, 1994.
DIOS Schulungsunterlagen, SGZ-Bank, dated Oct.-Nov. 10,1994.
Rundschreiben of the SGZ-Bank to the Volks- and Raiffeisenbanken / 4 letters, dated Aug. 15, 1998, Apr. 13, 1995, Jul. 4, 1994, Aug. 10, 1995 (German).
Information / Matarbeiterzeitung der SGZ-Bank / Sep. 1994, pp. 1-2 (German).
Rundschreiben of the SGZ-Bank to the Volks- and Raiffeisenbanken / 2 letters, dated Nov. 10, 1994 and Nov. 11, 1994 (German).
Notice from Mrs. Christa Franke, dated Jan. 31, 1995, to Herrn Dr. Franke and Herrn Seip (German).
Declaration "Christa Franke" of Dec. 18, 1997, together with Notice to Herrn Dr. Franke and Herrn Seip of Feb. 3, 1995 (German).
Message from REUTER of Jan. 1995 concerning CATS-OS (German).
Extract from "Wirtschaftswoche," No. 5 / Jan. 28, 1995, p. 88 (German).
"Computerwissen," Verlag Markt +Technik 1992, Haar/Munchen, p. 236/237 (German with English Translation).
Lecture by Dipl.-Math. Steffen Rabmann, "Sicherheit in der Korrununikationstechnik . . . ," Sep. 1993 (German).
Prospekt DIOS / Stand 2 / 1996 (German).
Prospekt DIOS / Stand 4 / 1995 (German).
DIOS Pflegedialoge—Schulung—Apr. 10, 1994 (German).
Letter Fiducia of Apr. 10, 1995 (German).
Prospekt F1DUCIA, Jun. 27-29, 1995 (German).
Kurzbeschreibung, "Erste Schritte" of the DIOS System, dated May 10, 1995.
"Bildschirmmasken" des DIOS Systems, dated Dec. 8, 1997.
Udo Bretschneider: PC für Einsteiger Data Becker, Düsseldorf, 1994: pp. 512-513 (English Translation).
DIOS: Documentation of a test of the request mode and of the refresh function of May 24, 1995.
DIOS: Printout from a display screen, dated Jun. 19, 1995, showing the request mode.
DIOS: Release planning of the DIOS system of Nov. 15, 1996.
Letter from SGZ-Bank to Volksbank eG, a participant in the pilot phase, dated Jul. 21, 1994.
Response to comment on the Oppositions by Siemens Nixdorf Informationssysteme AG.
Response to comment on the Oppositions by Bayerische Vereinbank AG.
Response to comment on the Oppositions by Commerzbank AG.
Response to comment on the Oppositions by Deutsche Bank AG.
Response to comment on the Oppositions by Deutsche Borse AG.
Response to comment on the Oppositions by Schwizerischer Bankverein AG.
Response to comment on the Oppositions by SGZ-Bank AG.
Author unknown, English Translation—DIOS—Short Description (at the start of the pilot phase); SGZ Bank, Sep. 26, 1994.
Author unknown, English Translation—DIOS—111.2.5 Reaction time, version 11, p. 47, May 25, 1994.
Author unknown, English Translation—DIOS (brief overview); SGZ Bank, Apr. 1995.

Brand, Rupp, Wiedl, English Translation — *Performance catalog for MB foreign exchange*, SGZ Bank, version 12, pp. 6, 22, 79, 92, 99-100, 102, May 31, 199.

International Search Report for International Application No. PCT/EP96/03972, dated Dec. 10, 1996 (mailing date).

European Search Report for Application No. 99123955.9-2201, dated Jan. 5, 2001.

Internet Site https://wplitn.net/cgi/store (Reference Not Included).

"Planned Bloomberg Equity Trading System to Route Equities Orders to NYSE's Superdot,"*Trading Systems Technology*, vol. 5, No. 7, Oct. 7, 1991.

Schmerken, Ivy, "Chicago's Fate in a World of Futures," *Wall Street & Technology*, v. 10, n. 7, p. 22, Feb. 1993.

Adamson et al, "Joining Security Realms: A Single Login for NetWare and Kerberos," CITI Technical Report 95-1, Center for Information Technology Integration, University of Michigan, Feb. 7, 1995.

Decision of the Technical Board of Appeal 3.5.01 for European Patent No. 0762304, 34 pp., dated May 28, 2008.

SuperSoes and SelectNet Quick Reference 1997.

Gale Group: "Instinet's purchase of BOMAR yields technical analytics"; 8-7-92.

\* cited by examiner

SYSTEM AND METHOD OF INTERFACING FOR CLIENT APPLICATION PROGRAMS TO ACCESS A DATA MANAGEMENT SYSTEM

PRIORITY

This application claims priority to applicants' co-pending application entitled "Computer System for Data Management and Method for Operating said System" having Ser. No. 08/836,713, filed May 13, 1997, claiming priority to applicants' PCT application No. PCT/EP96/03972, filed Sep. 10, 1996, which claims priority to applicants' EPO application No. 95114467.4 filed Sep. 14, 1995 (hereinafter the "CATS-OS system"), each of which is incorporated herein by this reference. This application also claims priority to co-pending application entitled "Computer System for Data Management and Method for Operating said System" having Ser. No. 09/454,978, filed Dec. 3, 1999, which claims priority to co-pending application entitled "Computer System for Data Management and Method for Operating said System" having Ser. No. 08/836,713, filed May 13, 1997, and applicants' applications entitled "Use of Computer System for Data Management and Method for Operating the System for Request for Quote" having Ser. No. 60/111,031, "Sales Trader Use of Computer System for Data Management and Method for Operating the System" having Ser. No. 60/111,030, and "Method and System for Warrant Trading Data Management" having Ser. No. 60/111,032, each filed Dec. 4, 1998, each of which is also incorporated herein by this reference.

FIELD OF THE INVENTION

The present invention is a system and method for allowing trading of securities using a network and at least one computer that dynamically creates multiple classes to execute trading functions.

BACKGROUND OF THE INVENTION

With the advent of technology has come the desire to execute securities transactions in faster and more efficient methods. One method involves using a global network and a computer system as an interface between the person desirous of executing the trade and the trader.

The existing CATS-OS system includes use of a client-server architecture, which has a number of servers. These servers include, for example, a transaction server, a rate server, a hand-off server, a credit server, and a security server. In a typical interaction with the system, the user of the CATS-OS system connects to the system and is authenticated by the security manager, which allows the user certain privileges depending on the level of the user, such as customer, trader, and administrator.

A request for quote aspect of the CATS-OS system allows deals to be consummated that exceed the limits allowed by the host bank and in other circumstances in which a rate may not be available, for example, by allowing a trader to respond to a request for a quote and to provide a proposed price against which the user can trade. A sales trader aspect of the CATS-OS system allows a special type of trader, referred to as a sales trader, to deal on behalf of a selected customer within the CATS-OS system. A multi-bank aspect of the CATS-OS system allows a plurality of banks to deliver their prices and enables the single bank CATS-OS system to perform in a multi-bank mode by establishing links to one or more additional banks.

In the existing CATS-OS system, every component of the CATS-OS object linking and embedding (OLE) interfaces has only one top-level single createable class, called master class. The existing version of the OLE servers in the CATS-OS OLE interface has a simple flat hierarchy. Presently, the instance properties of all of its classes are set to be createable multi-use so that the OLE server can handle multiple objects of every class created by one or more OLE client applications. With this structure, only one instance of CATS-OS OLE interface is running to deal with all connections. Obviously, the existing CATS-OS interface can become a bottleneck when massive parallel connection requests are invoked.

A goal of the existing CATS-OS system is to provide the ability for a user working at a workstation, or particularly at a personal computer (PC), to automatically and electronically trade whether it is foreign exchange (FX) warrants or other instruments. As the existing CATS-OS system has been deployed to customers, and as electronic commerce has grown, it has become apparent that additional issues arise in doing electronic commerce.

For example, an issue that many organizations have is that in performing a trade at a PC, redundant entries are necessary into a number of the organization's other systems. Another potential issue for certain organizations which wish to use the existing CATS-OS system for automating electronic commerce is that a certain degree of manual intervention is still required for a user to perform the trade at the PC, so it is difficult to thoroughly automate the process.

In one exemplary conventional system, the server computer has installed into its software a single class. A class is a specification of what types of data and functions are permissible. As an example, one class may involve letter manipulation. In this class, the data type is "string" which is a serial collection of letters. A permissible function within this class is addition. Thus, a user of this class first creates objects (i.e. words like "cat" and "s") and adds them together (i.e. "cat"+"s" results in the new string "cats").

In this example, the addition function is defined to add the second presented string to the first in a serial fashion. Thus, if a user were to execute this addition function as follows: "s"+"cat", the result would be a new string "scat". Similarly, if the data type were strictly limited to letters, the function "4"+"7" would not result in "47" nor the traditional arithmetic result "11" but would result in an error message as the class would be expecting to operate on letters and not numbers.

From this simple example, a class is therefore defined as a software tool that allows users to operate on 1) specific data types using 2) specifically defined functions.

With this background established, a conventional trading system was developed where a single class was defined and the multiple traders accessed the definitions and functions of that class. While a single class can operate on multiple objects of that class, a bottleneck occurs if too many objects are in need of class resources at one time. More specifically, in this conventional system, each trader in the exchange is given his/her own object of the class. If there are thousands of traders trying to execute trades simultaneously, the computer will continually access the class definitions and functions to execute those trades. If there are more objects accessing class resources than the system can process at one time, the computer will begin to generate error messages and prevent certain trades from being executed. In a very bad scenario, the computer may shut down from this overload.

SUMMARY OF THE INVENTION

The present invention overcomes the problems of the conventional systems by creating multiple classes to execute a plurality of trades in parallel. The number of classes created dynamically at any given time is proportional to the number of clients attempting to execute securities transactions at that time. In addition, in another preferred embodiment of the present invention, each class created, has the capability of processing a plurality of objects at a single time. Thus, the capabilities of the software are expanded and the number of clients who can execute securities transactions at any given time is increased.

BRIEF DESCRIPTION OF THE DRAWINGS

The accompanying drawings, which are incorporated in and form a part of the specification, illustrate preferred embodiments of the present invention and, together with the description, disclose the principles of the invention. In the drawings.

DETAILED DESCRIPTION OF THE DRAWINGS

Figure 1:
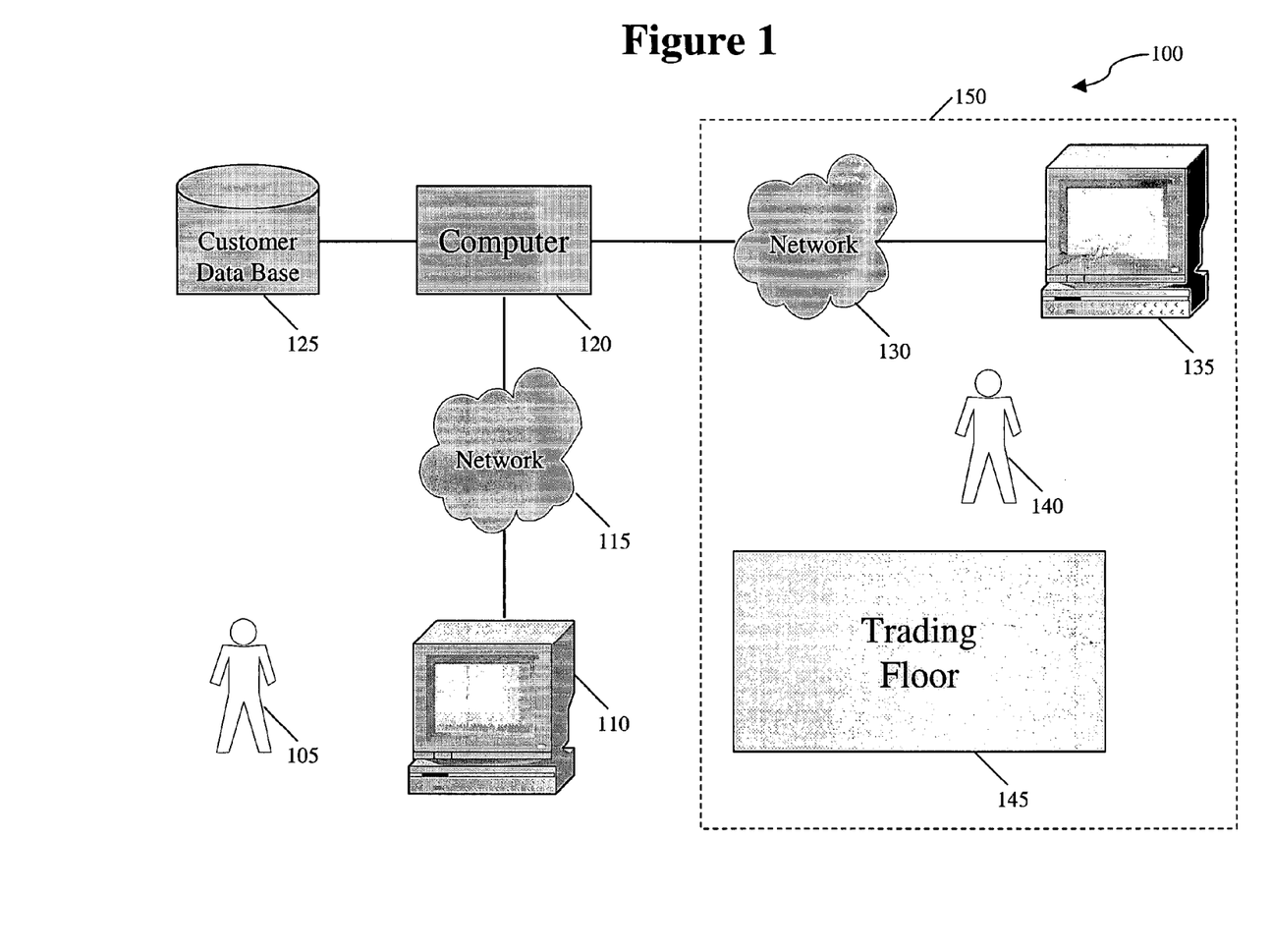
FIG. 1 is a block diagram of a system, according to a preferred embodiment of the present invention.

Reference will now be made in detail to preferred embodiments of the invention, non-limiting examples of which are illustrated in the accompanying drawings. FIG. 1 is a system 100 in accordance with an embodiment of the present invention. A customer 105 uses his/her personal computer (PC) 110 to interact with the other components of system 100. It should be noted that in alternative embodiments, PC 110 is replaced with either a cell phone, a personal digital assistant or pager that all have Web browsing capabilities.

PC 110 is coupled to a network 115. In a preferred embodiment, network 115 is the Internet. Network 115 is coupled to a computer 120. Computer 120 is coupled to database 125. Computer 120 is also coupled to another network 130, which, in a preferred embodiment, is an intranet. Network 130 is coupled to PC 135. A floor trader 140 uses PC 135 to receive and transmit information and conduct trades on the trading floor 145. It should also be noted that computer 120 is a server capable of running in a Win 32 platform, such as Windows 95 or Windows NT.

In general, system 100 allows customer 105 to transmit and receive information to and from trader 140. The data exchange between customer 105 and trader 140 includes data relating to request for quotes (RFQ), purchases of warrants or other securities and confirmation of the purchase of warrants or other securities.

Figure 2:
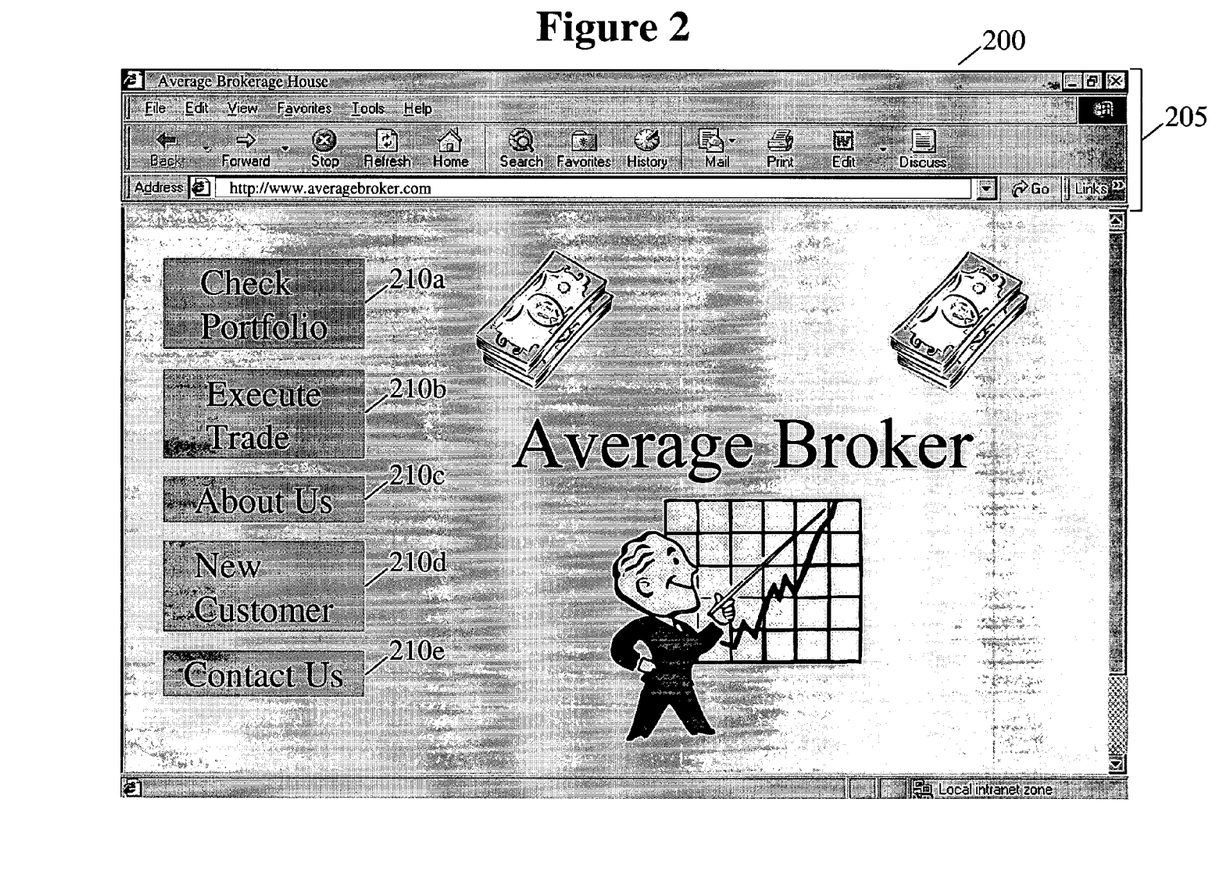
FIG. 2 is a screen-shot of a Web site, according to a preferred embodiment of the present invention.

FIG. 2 is a Web site 200 within a browser of a brokerage house who has implemented the present invention. Section 205 contains buttons and functions found on a standard browser. Section 210 contains links to other Web pages from this Web page that give the user increased functionality. Button 210*a* allows a current customer of the proprietor of this Web site to check the status of his/her portfolio. Button 210*b* links the customer to another Web site where the customer may execute a warrants or securities trade. Button 210*c* links the user to another Web site where the user may learn about the brokerage house's capabilities, fees and personnel. Button 210*d* links users to a Web site where they can join and become customers of the proprietor of this Web site. Button 210*e* links the user/customer to another Web site where the user/customer may contact the proprietor of the Web site via either email, telephone or regular mail service.

Figure 3:
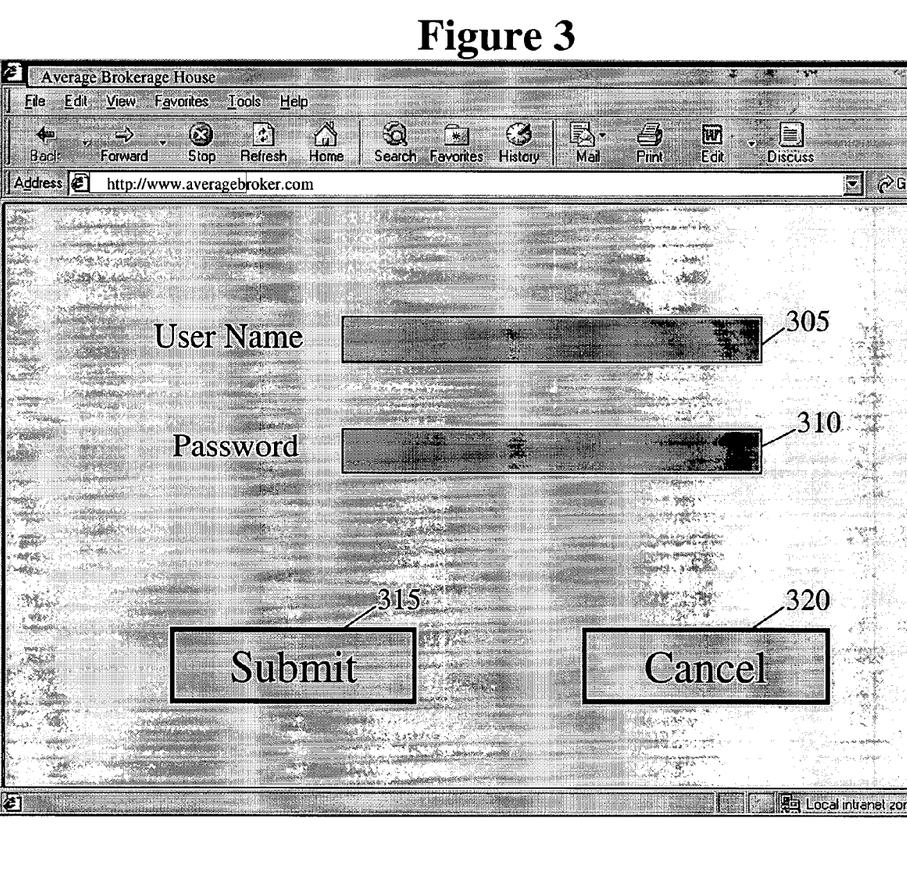
FIG. 3 is a screen-shot of a Web site, according to a preferred embodiment of the present invention.

If the user is an existing customer and clicks on either button 210*a* or 210*b* of FIG. 2, he/she will be linked to another Web site to verify that he/she is authorized to transact business. FIG. 3 depicts an example of a Web site to which a user is linked in order to submit the data required by computer 120 to verify that the user is an existing customer. The user enters his/her name in field 305 and password in field 310, then clicks on the submit button 315. If the user does not wish to progress with this operation, he/she clicks on the cancel button 320.

Figure 4:
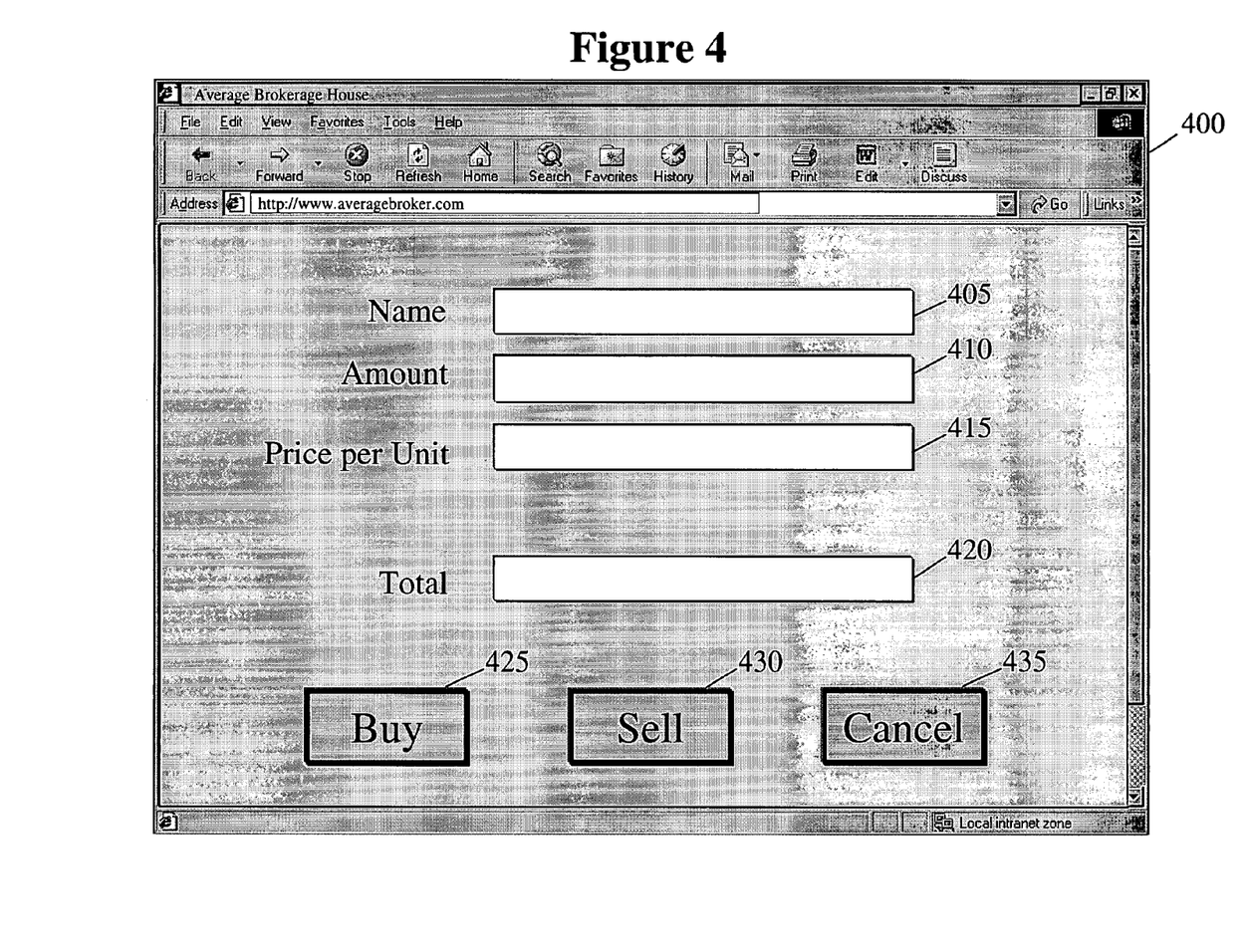
FIG. 4 is a screen-shot of a Web site, according to a preferred embodiment of the present invention.

FIG. 4 is a Web site a customer uses to begin executing a trade. In a preferred embodiment, Web site 400 is presented to the customer when he/she clicks on link 210*b* on screen 200 and enters the required data of FIG. 3. Web site 400 contains various fields that the customer enters to begin a warrants or securities trade. In this example, the customer enters the name of the security or warrant he wishes to purchase in field 405. In field 410, the customer enters the number of shares in the warrant or security he/she wishes to purchase. In field 415, the customer enters the price per share he/she is willing to pay. The client application automatically multiplies the amount and price per share entered to provide the customer with a total for the purchase in field 420. The customer then clicks on button 425 to request to buy those shares, button 430 to request to sell those shares, or button 435 to cancel the transaction.

Figure 5:
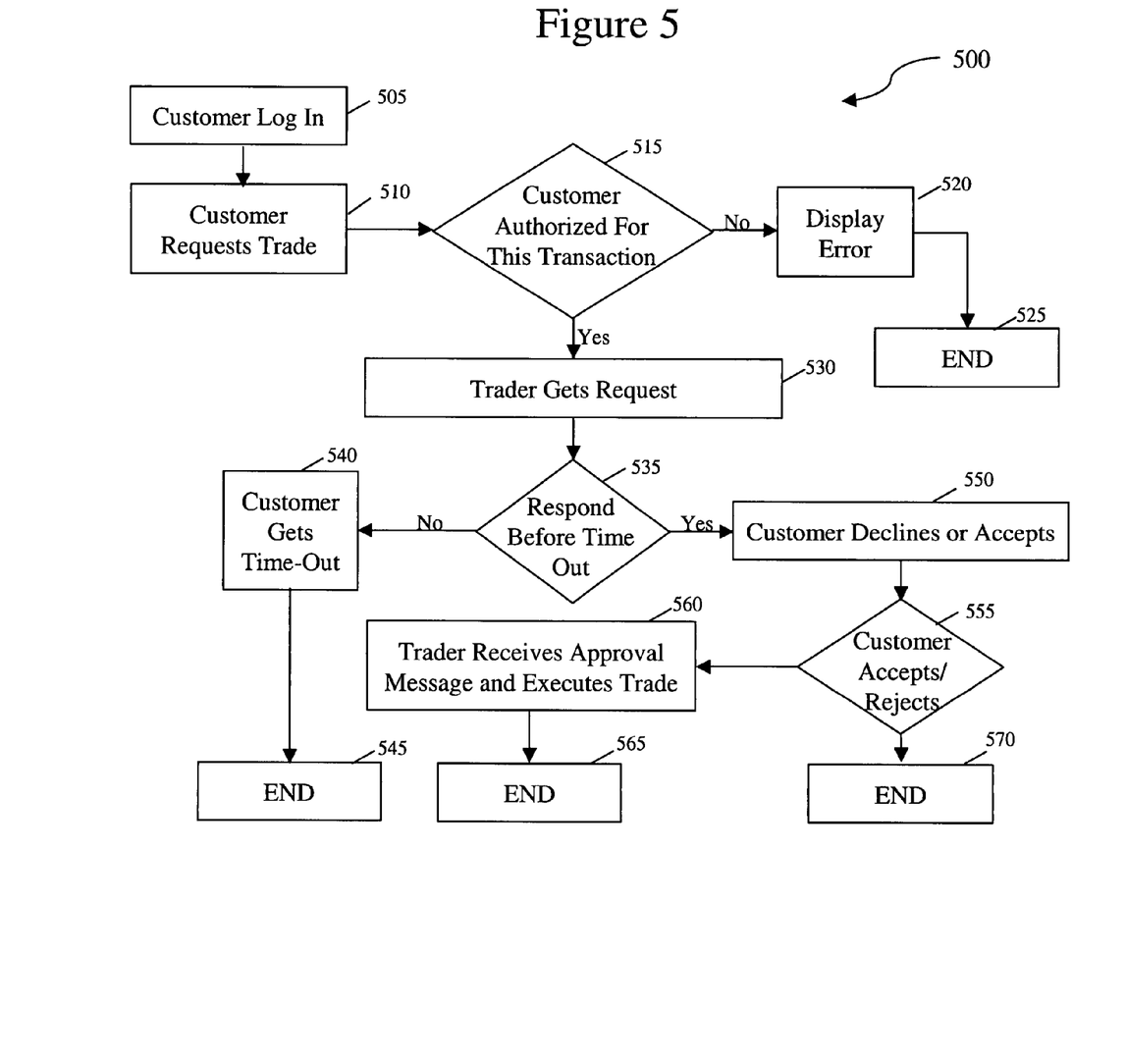
FIG. 5 is a flowchart of a process for executing a trade, according to a preferred embodiment of the present invention.

FIG. 5 is a process 500 in accordance with a preferred embodiment of the present invention. At block 505, the customer logs onto the system. Typically, this involves entering a user name and password as shown in FIG. 3 and computer 120 using database 125 to confirm that this is a valid customer attempting to execute a trade. At block 510, the customer enters the requisite information to execute the trade he/she desires. In some implementation of this invention, the beginning of the execution of a trade is called a request for quote (RFQ), in that the customer is requesting the trader to accept the proposed "bid" and inform the customer of the fees associated with the trade. In one example, this is done via the Web site shown in FIG. 4.

At block 515, computer 120 performs a plurality of checks to determine if this customer is authorized to execute the requested transaction. For example, computer 120 pulls existing customer data from database 125 and uses the existing data to determine if the customer can execute this trade. More specifically, computer 120 determines whether or not this customer has the credit rating sufficient to pay for the purchase, is allowed to trade in the number of shares requested or not, etc. If the customer does not have the right credentials to carry-out the requested trade at block 515, computer 120 transmits a Web page informing the customer that the trade could not be executed at block 520 and the process ends at block 525.

If the customer has the right credentials to carry-out the requested trade at block 515, computer 120 transmits the trade request to PC 155 via network 130 at block 530. At block 535, trader 140 has the opportunity to respond to the request from the customer. In a preferred embodiment of the present invention, trader 140 has about 7 seconds to respond to the requested trade by the customer before computer 120 revokes the request as being stale. If trader 140 does not accept the request within the time allotted, the trade is voided and the customer is so informed at block 540, and the process ends at block 545.

If trader 140 accepts the trade at block 535 within the allotted time period, computer 120 sends a notice of acceptance to the customer at block 550. Also in block 550, the customer is given the opportunity to review the order and the commission charged by trader 140 to execute this trade. At block 555, the customer decides if he/she wishes to accept or reject the trade. If the customer accepts the trade at block 555, then a confirmation number and a message are given to the customer at block 560, indicating that the trade has been accepted by both, the customer and trader 140, and will be executed in due course. The process then ends at block 565. If the customer rejects the response by trader 140 at block 555, the process ends at block 570.

Figure 6:
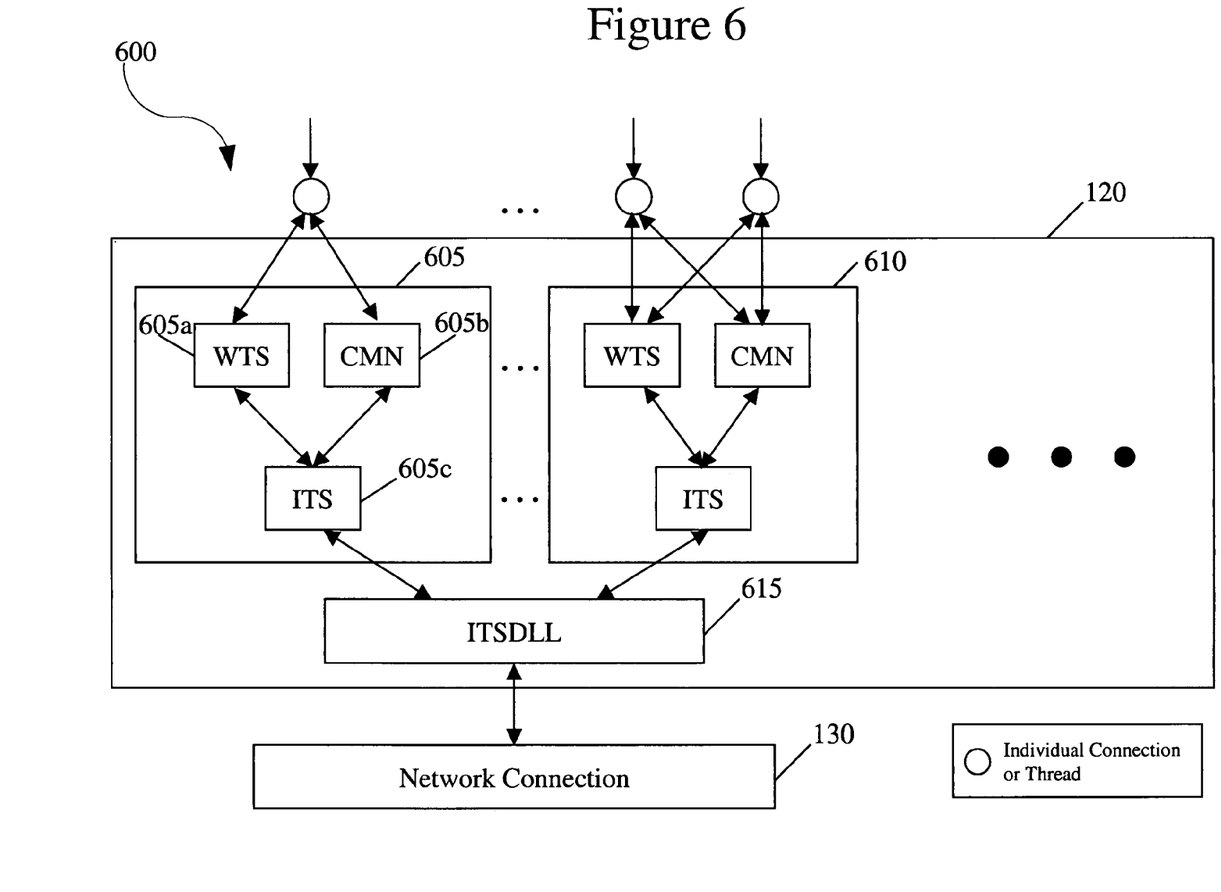
FIG. 6 is a block diagram of components within a computer, in accordance with a preferred embodiment of the present invention.

FIG. 6 is an example of class components created as customers request service from system 100 of FIG. 1. In a preferred embodiment, whenever a customer obtains access to the trading services provided by the proprietor, these three classes are created to handle the data transmitted between customer 105 and trader 140. In this preferred embodiment, if a single customer is attempting to execute multiple transactions or portfolio summaries at one time, that customer will be linked to a plurality of classes and associated objects shown in FIG. 6. In an alternative embodiment, each set of classes can handle more than one customer transaction. As each customer transaction is added to computer 120, objects are also created and associated with one set of the created class components.

Computer 120 creates a plurality of classes and associated objects to handle the customers as they log into the system. Thus, sets of class components 605 and 610 are created and destroyed as the need arises. In a preferred embodiment, the individual class components in each set 605 and 610 are object linking and embedded (OLE) class types.

Class component CMS 605b supports objects that include functionality that is common to a variety of customer applications loaded onto PC 110. More specifically, this class component supports objects that allow customers to log onto system 100 and obtain access to traders 140 as well as checking the password of those customers for security purposes. As can be seen, every customer must be verified and obtain access to traders 140 so this functionality is shared across all customers regardless of whether the customer executes a trade or not.

Class component WTS 605a contains a library of functions that allow the customer to send and receive messages to and from the warrants or securities trading system, as represented by trader 140 and PC 135. Thus, the library functions within the WTS class component 605a are specific to the trading system used by trader 140. In addition, class component WTS 605a also contains library functions to register new customers, obtain quotes of warrant or security prices from the trading floor 145 and maintain a transaction summary of executed buy and sell orders by recording the start and end dates of the trade, the customer reference number and system reference number.

Class component ITS 605c supports objects that act as a translator and go-between between the objects of the other class components 605a and 605b, and the trading floor 145 via ITSDLL 615a. It should be noted that the class component ITS 605c is capable of operating in both a synchronous and asynchronous format.

This type of structure where the classes are created dynamically as needed is called a dynamically linked library (DLL). Instead of designing the class components to be static, the class components 605 are created dynamically to match more closely the requirements of the clients. As an example, for small time traders, the maximum amount that a smaller client may execute is limited. Additionally, depending on the pricing scheme, small clients may be limited to fewer number of trades per day than larger clients. Larger clients may be given more options due to the volume in which they trade. Thus, classes are created with specific functions to handle smaller clients and other classes are created to process data generated by larger clients.

Various preferred embodiments of the invention have been described in fulfillment of the various objects of the invention. It should be recognized that these embodiments are merely illustrative of the principles of the present invention. Numerous modifications and adaptations thereof will be readily apparent to those skilled in the art without departing from the spirit and scope of the present invention.

What is claimed is:

1. A system comprising:
   a customer terminal;
   a trader terminal operatively coupled to the customer terminal through a communications network;
   a processor;
   wherein the processor is configured to dynamically create sets of class components to handle one or more trade requests from a customer at the customer terminal, with each set of class components further comprising:
   a first component comprising functions for sending messages and receiving messages to the system on behalf of the customer;
   a second component comprising functions for controlling access to the system by the customer; and
   a third component comprising functions for sending messages to and receiving messages from the first component and a trader at the trader terminal; and
   wherein each set of class components is dynamically created for each customer submitting the one or more trade requests; and
   wherein the processor comprises a timer wherein the trade request from the customer is automatically revoked at a predetermined duration of time if the trader does not accept the trade request.

2. The system of claim 1 wherein the third component operates in a synchronous format.

3. The system of claim 1 wherein the third component operates in a asynchronous format.

4. The system of claim 1 wherein the set of class components are configured to handle a single customer at one time.

5. The system of claim 1 wherein the set of class components are configured to handle multiple customers at one time.

6. The system of claim 1 wherein the set of class components are configured to handle a single transaction at one time.

7. The system of claim 1 wherein the set of class components are configured to handle multiple transactions at one time.

8. The system of claim 1 wherein the processor creates sets of class components based on the number of transactions.

9. A method comprising:
   dynamically creating, in a processor, a set of class components to handle one or more trade requests for a customer, which further comprises:
   creating a first component comprising functions for sending messages and receiving messages to a system on behalf of a customer;
   creating a second component comprising functions for controlling access to the system by the customer; and creating a third component comprising functions for sending messages to and receiving messages from the first component and a trader;

wherein each set of class components is dynamically created for each customer submitting the one or more trade requests; and transmitting messages between the customer and the trader through a communications network; and automatically revoking, by the processor, at a predetermined duration of time the trade request from the customer if the trader has not accepted the trade request.

10. The method of claim 9 wherein each component is created in response to a customer accessing the system.

11. A trading services computer program product encoded on computer-readable medium that when executed by a computer system performs a method comprising:

upon a customer accessing trading services to submit one or more trade requests to a trader, creating at least one set of classes, each set comprising at least one class;

wherein the created classes include at least one of:

an access control class configured to control access to the system by the customer;

a trading system communications class configured to control transmission and receipt messages between the customer and the trader; and a translator class configured to control interaction between class components;

wherein each set of class components is dynamically created for each customer submitting the one or more trade requests; and revoking at a predetermined time the trade request from the customer if the trader does not accept the trade request.

12. The trading services computer program product of claim 9 where a set of classes is associated with one transaction.

13. The trading services computer program product of claim 9 where a set of classes is associated with a plurality of transactions.

14. The trading services computer program product of claim 9 each class being an object linking and embedded class type.

15. The trading services computer program product of claim 9 where created classes include an access control class, a trading system communications class, and a translator class.

16. A computer implemented method for trading financial instruments, the method comprising:

upon a customer accessing trading services to submit one or more trade requests to a trader, creating, in a processor, at least one set of classes, each set comprising at least one class;

wherein the created classes include at least one of:

an access control class configured to control access to the system by the customer;

a trading system communications class configured to control transmission and receipt messages between the customer and the trader; and a translator class configured to control interaction between class components;

wherein each set of class components is dynamically created for each customer submitting the one or more trade requests; and revoking, by the processor, at a predetermined time the trade request from the customer if the trader does not accept the trade request.

17. The computer implemented method for trading financial instruments of claim 16 where a set of classes is associated with one transaction.

18. The computer implemented method for trading financial instruments of claim 16 where a set of classes is associated with a plurality of transactions.

19. The computer implemented method for trading financial instruments of claim 16 each class being an object linking and embedded class type.

20. The computer implemented method for trading financial instruments of claim 16 where created classes include an access control class, a trading system communications class, and a translator class.

* * * * *